United States Patent
Raynor

(10) Patent No.: US 10,922,590 B2
(45) Date of Patent: Feb. 16, 2021

(54) APPARATUS, METHOD AND COMPUTER PROGRAM FOR PERFORMING OBJECT RECOGNITION

(71) Applicant: STMicroelectronics (Research & Development) Limited, Buckinghamshire (GB)

(72) Inventor: Jeffrey M. Raynor, Edinburgh (GB)

(73) Assignee: STMICROELECTRONICS (RESEARCH & DEVELOPMENT) LIMITED, Marlow (GB)

(*) Notice: Subject to any disclaimer, the term of this patent is extended or adjusted under 35 U.S.C. 154(b) by 161 days.

(21) Appl. No.: 15/892,974

(22) Filed: Feb. 9, 2018

(65) Prior Publication Data
US 2019/0251403 A1    Aug. 15, 2019

(51) Int. Cl.
| G06K 9/68 | (2006.01) |
| G06K 9/20 | (2006.01) |
| H04N 13/204 | (2018.01) |
| H04N 13/271 | (2018.01) |

(52) U.S. Cl.
CPC .......... *G06K 9/6857* (2013.01); *G06K 9/209* (2013.01); *H04N 13/204* (2018.05); *H04N 13/271* (2018.05)

(58) Field of Classification Search
CPC .... G06K 9/6857; G06K 9/209; H04N 13/204; H04N 13/271
See application file for complete search history.

(56) References Cited

U.S. PATENT DOCUMENTS

| 5,856,667 A | 1/1999 | Spirig et al. |
| 7,254,255 B2 | 8/2007 | Dennis |
| 9,753,119 B1* | 9/2017 | Velusamy ................. G01S 5/20 |
| 9,886,769 B1* | 2/2018 | Tremaine ............. G06K 9/0063 |
| 9,911,073 B1* | 3/2018 | Spiegel ..................... G06T 7/33 |
| 10,275,919 B1* | 4/2019 | Bastide ................... G06T 11/60 |
| 2004/0223630 A1* | 11/2004 | Waupotitsch ....... G06K 9/00275 382/118 |
| 2012/0050483 A1* | 3/2012 | Boross ................. H04N 13/122 348/46 |
| 2013/0044128 A1* | 2/2013 | Liu .......................... G09G 5/00 345/633 |
| 2014/0007224 A1* | 1/2014 | Lu ........................... G06F 21/32 726/19 |
| 2015/0310307 A1* | 10/2015 | Gopalan .............. G06F 16/434 382/103 |
| 2016/0379041 A1* | 12/2016 | Rhee ...................... G06T 19/20 382/118 |
| 2017/0091953 A1* | 3/2017 | Bleiweiss ................. G06T 7/11 |

(Continued)

OTHER PUBLICATIONS

Kent, "Malaysia car thieves steal finger," BBC News, last updated on Mar. 31, 2005, retrieved from http://news.bbc.co.uk/2/hi/asia-pacific/4396831.stm on Feb. 1, 2018, 1 page.
Lettice, "Carjackers swipe biometric Merc, plus owner's finger," The Register, published on Apr. 4, 2005, retrieved from https://www.theregister.co.uk/2005/04/04/fingerprint_merc_chop/ on Feb. 1, 2018, 6 pages.

(Continued)

*Primary Examiner* — Santiago Garcia
(74) *Attorney, Agent, or Firm* — Seed IP Law Group LLP

(57) ABSTRACT

An apparatus for performing object recognition includes an image camera to capture a first resolution image and a depth map camera to capture a second resolution depth map. The first resolution is greater than the second resolution. The apparatus is configured to perform object recognition based on the image and the depth map.

25 Claims, 9 Drawing Sheets

(56) References Cited

U.S. PATENT DOCUMENTS

| | | | |
|---|---|---|---|
| 2017/0150118 A1* | 5/2017 | Pacheco | G06T 7/285 |
| 2017/0154204 A1* | 6/2017 | Ryu | G06K 9/00208 |
| 2017/0228940 A1* | 8/2017 | Kutliroff | G06T 19/20 |
| 2018/0018788 A1* | 1/2018 | Olmstead | G06K 9/00624 |
| 2018/0018805 A1* | 1/2018 | Kutliroff | G06T 17/00 |
| 2018/0061276 A1* | 3/2018 | Baca | H04N 13/207 |
| 2018/0121713 A1* | 5/2018 | Guo | H04N 1/00 |
| 2018/0139431 A1* | 5/2018 | Simek | H04N 13/232 |
| 2018/0184065 A1* | 6/2018 | Zhao | G06F 3/01 |
| 2018/0364731 A1* | 12/2018 | Liu | G05D 1/0246 |
| 2019/0122031 A1* | 4/2019 | Eriksson | G08B 13/19602 |
| 2019/0122378 A1* | 4/2019 | Aswin | G06T 7/571 |
| 2019/0228210 A1* | 7/2019 | Liu | G06K 9/00255 |
| 2019/0244011 A1* | 8/2019 | Liu | G06K 9/2036 |

OTHER PUBLICATIONS

Leyden, "Gummi bears defeat fingerprint sensors," The Register, published on May 16, 2002, retrieved from http://theregister.co.uk/2002/05/16/gummi_bears_defeat_fingeprint_sensors on Feb. 1, 2018, 6 pages.

Smith, "Credit card with a fingerprint sensor revealed by Mastercard," BBC, published on Apr. 20, 2017, retrieved from http://www.bbc.com/news/technology-39643453 on Feb. 1, 2018, 12 pages.

"Tango (platform)," Wikipedia, retrieved from https://en.wikipedia.org/wiki/Tango_%28platform%29 on Feb. 1, 2018, 6 pages.

"Gorilla Glass," Wikipedia, retrieved from https://en.wikipedia.org/wiki/Gorilla_Glass on Feb. 1, 2018, 4 pages.

"Kinect," Wikipedia, retrieved from https://en.wikipedia.org/wiki/Kinect on Feb. 1, 2018, 19 pages.

* cited by examiner

| 902 Component for capturing an image | 904 Component for capturing a depth map |

| 906 Component for determining whether a detected face matches a known face based on an image | 908 Component for determining whether a detected face matches a known face based on a depth map |

| 910 Component for upscaling the resolution of a depth map to match the resolution of an image | 912 Component for aligning a depth map with an image to generate a combined image and depth map |

| 914 Component for determining a size of a detected face and a distance to a detected face based on a depth map | 916 Component for determining whether a detected face matches a known face based on a combined image and depth of the face |

| 918 Component for determining a skin tone of a detected face based on an image | 920 Component for determining a position of a detected face in a depth map |

922 Component for determining a position of a detected face in an image based on a position of the detected face in a depth map

FIG.9

APPARATUS, METHOD AND COMPUTER PROGRAM FOR PERFORMING OBJECT RECOGNITION

BACKGROUND

Technical Field

The present disclosure relates to an apparatus, a method and a computer program for performing object recognition.

Description of the Related Art

Radio frequency identification (RFID) credit or debit cards are available and favored by some users. Indeed, as no authorization is required they are quick and easy to use. An issue may arise when the cards are lost or stolen as they can be used by malicious users. Occasionally, the cards require a Personal Identification Number (PIN) to authorize payments but this negates the convenience factor. A method currently used involves restricting the payment amount (currently £30 but will increase to £50). Increasing the transaction limit will increase the losses due to malicious users.

Some cards employ fingerprint readers to authorize payments. Likewise, some portable devices, such as mobile phones, also employ fingerprint readers to be unlocked. Fingerprints are two-dimensional objects and ideally two-dimensional sensors are employed. These are usually large (as large as a fingerprint—2 cm*3 cm). Alternatively, a smaller sensor may be used with a lens (which adds to the thickness) or the finger is scanned over the smaller sensor (e.g., linear array). However, scanning the fingerprint may be troublesome, time-consuming and error prone especially if the users do not move their fingers in a desired manner. Additionally, fingerprints are easily copied or even the fingers could be cut-off. As a result, live finger detection is often implemented.

Face recognition is another biometric technique to identify users and check that users are authorized to unlock a mobile phone or make financial transactions. If a camera is mounted on the front of the mobile phone, by orientating the mobile phone the camera may also be orientated to point at the user's face. The camera can acquire an image of the user's face and then perform face recognition algorithms to check if the user is authorized. There are many algorithms known to perform face recognition.

Currently, most imaging systems are two-dimensional imaging systems. As a result, it can be easily fooled by showing a photograph of an authorized user.

A more reliable method to authenticate users is to employ a three-dimensional imaging system. A face is three-dimensional whereas a photograph of a face is only two-dimensional and so it is not possible to use a photograph of a face to fool a three-dimensional imaging system. Such system has the advantage of quick and easy way to authenticate a user.

Stereo imaging systems use two cameras or a single camera and two light sources. The parallax from either the two cameras or two light-sources can be used to derive the distance between an object and the two cameras or two light-sources. In a stereo imaging system, the depth accuracy is related to the distance between the two cameras or two light-sources. The larger the distance, the greater the parallax and the more accurate the depth. Hence such systems are not suitable for mobile phones which are small and have limited space available to place sensors and emitters.

Another type system uses a pulsed Light Emitting Diode (LED) light source and an array of fast detectors which can record the time of arrival of the photons by moving the photogenerated charge into a memory inside each pixel. Usually the light source used for depth mapping is (near) infra-red (800 nm-980 nm) so that it is not visible and therefore not distracting for the user. Each pixel can operate either as a time-of-flight depth mapping sensor or an imaging sensor. These pixels are sometimes referred as "RGBZ" pixels where R, G and B are red, green and blue channels and Z is a depth or distance channel. Typical pixel sizes are between 3 µm to 5 µm and accordingly a high resolution array is large. The trouble is that these pixels are large and expensive in order to accommodate the in-pixel storage of time-dependent photocharge. Moreover, it is often necessary to implement visible-stop filters on the infra-red sensors (to reject ambient light) and to have narrow-band (color) filters on the imaging sensors. Typical compounds used for the color filters pass infra-red light, resulting in an image with degraded color accuracy.

Modern mobile phones tend to have multi-megapixel front-facing "selfie" cameras. For example a known phone has an 8 Mpixel camera with 1.4 µm pixels. If these pixels were replaced by 5.6 µm depth mapping pixels the image plane would be sixteen times larger, the lens would be four times larger and the module likely to be four times thicker.

Several mobile phones also have "dual cameras." These tend to be similar image cameras but with different optics. For example, the image cameras have different fields of view and the phone implements a software to resemble zoom.

Single Photon Avalanche Diodes (SPADs) time of flight sensors are excellent at measuring distances. They are "direct time-of-flight" sensors measuring the arrival time of each individual photon and so can produce more depth information than indirect methods for example producing a histogram of depth, so that objects at multiple depths can be identified (e.g., glass between the object and sensor). However, the size of the SPAD sensors (10 µm-30 µm) and their complex readout means that it is very difficult to produce a high resolution (>0.5 Mpixel) array. Typical resolutions are from 0.4 kpixels (20×20 pixels) to 3.6 k pixels (60×60 pixels).

SUMMARY

According to one aspect, there is provided an apparatus for performing object recognition, the apparatus comprising: an image camera to capture a first resolution image; and a depth map camera to capture a second resolution depth map; wherein the first resolution is greater than the second resolution; and wherein the apparatus is configured to perform object recognition based on the image and the depth map.

The apparatus may comprise a high resolution image camera and a low resolution depth map camera as opposed to a medium resolution hybrid image and depth map camera. In this way, the size and cost of the apparatus may be reduced and the efficiency of the object recognition may be increased.

The image camera may comprise an array of image pixels, the depth map camera comprises an array of depth map pixels, and a resolution of the array of image pixels is greater than a resolution of the array of depth map pixels.

The resolution of the array of image pixels may be between 1 Mpixels and 12 Mpixels and the resolution of the array of depth map pixels is between 0.4 kpixels and 308 kpixels.

The image pixels may be smaller than the depth map pixels.

The size of the image pixels may be comprised between 0.9 µm and 2 µm.

The size of the depth map pixels may be comprised between 2 µm and 30 µm.

The image pixels may comprise red pixels, green pixels and blue pixels.

The depth map pixels may comprise infrared pixels.

The infrared pixels may comprise Single Photon Avalanche Diodes (SPADs).

The image camera and the depth map camera may be arranged such that a field of view of the image camera and a field of view of the depth map camera are overlapping in an overlapping region.

The field of view of the image camera may be between 50° and 60°.

The field of view of the depth map camera may be comprised between 10° and 40°.

The image camera may comprise optics to direct light from the overlapping region toward a first array of pixels.

The image camera may comprise a filter to filter infrared light.

The depth map camera may comprise optics to direct light from the overlapping region toward the array of depth map pixels.

The depth map camera may comprise a filter to filter visible light.

The depth map camera may comprise an infrared light emitter to emit infrared light and optics to direct infrared light toward the overlapping region.

The image camera and the depth map camera may be arranged so that an optical axis of the image camera is coplanar with an optical axis of the depth map camera.

Performing object recognition based on the image and the depth map may comprise:

determining whether a detected object matches with a known object based on the image of the object.

Performing object recognition based on the image and the depth map may comprise: if the detected object matches with the known object, determining whether the detected object is two-dimensional or three-dimensional based on the depth map.

Performing object recognition based on the image and the depth map may comprise:

if the detected object is three-dimensional, determining whether the detected object matches the known object based on the depth map.

Determining whether the detected object matches the known object based on the depth map may comprise: determining a shape of the detected object based on the depth map; and comparing the shape of the detected object with a shape of the known object.

Determining whether the detected object matches the known object based on the depth map may comprise: determining features of the detected object based on the depth map; and comparing the features of the detected object with the features of the known object.

Determining whether the detected object matches the known object based on the depth map may comprise: determining positions of features of the detected object based on the depth map; and comparing the positions of the features of the detected object with the positions of features of the known object.

The apparatus may be configured to determine a distance between the apparatus and the detected object based on the depth map.

The apparatus may be configured to determine a shortest distance between the apparatus and the detected object based on the depth map.

The apparatus may be configured to determine a distance between the apparatus and a center of the detected object based on the depth map.

The apparatus may be configured to determine a size of the detected object based on the depth map.

The apparatus may be configured to determine a length of the detected object along a major axis and a width of the detected object along a minor axis.

The apparatus may be configured to: determine a tone of the detected object based on the image; and compare the tone of the detected object with a tone of the known object.

The apparatus may be configured to upscale the resolution of the depth map to match the resolution of the image.

The apparatus may be configured to align the depth map with the image based on the distance between the image camera and the depth map camera and the distance between the apparatus and the detected object.

The apparatus may be configured to: determine a position of the detected object in the depth map; and determine a position of the detected object in the image based on the position of the detected object in the depth map.

The depth map camera may comprise at least one component configured to perform at least one of the following steps: determining whether a detected object is two-dimensional or three-dimensional based on the depth map; determining whether a detected object matches a known object based on the depth map; determining the shape of a detected object based on the depth map and comparing the shape of the detected object with a shape of the known object; determining features of a detected object based on the depth map and comparing the features of the detected object with the features of the known object; determining the positions of features of a detected object based on the depth map and comparing the positions of the features of the detected object with the positions of features of the known object; determining a distance between the apparatus and a detected object based on the depth map; determining a shortest distance between the apparatus and a detected object based on the depth map; determining a distance between the apparatus and a center of a detected object based on the depth map; determining a size of a detected object based on the depth map; determining a length of a detected object along a major axis and a width of the detected object along a minor axis; upscaling the resolution of the depth map to match the resolution of the image; and determine a position of a detected object in the depth map.

By integrating at least some of the processing of the depth map directly into the depth map camera (e.g., same chip), the processing of the depth map may be less likely to be spoofed by a malicious user.

The image camera may comprise at least one component configured to perform at least one of the following steps: determining whether a detected object matches with a known object based on the image; aligning the depth map with the image based on a distance between the image camera and the depth map camera and a distance between the apparatus and a detected object; determining a position of a detected object in the image based on a position of the detected object in the depth map; and determining a tone of a detected object based on the image and comparing the tone of the detected object with a tone of a known object.

By integrating at least some of the processing of the image directly into the image camera (e.g., same chip), the processing of the image may be less likely to be spoofed by a malicious user.

According to a second aspect, there is provided a system comprising one of the above apparatuses.

The system may comprise a mobile phone, a tablet computer, a desktop computer, a laptop computer, a video game console, a video door or a smart watch.

According to a third aspect, there is provided a method for performing object recognition, the method comprising: capturing a first resolution image with an image camera; capturing a second resolution depth map with a depth map camera; wherein the first resolution is greater than the second resolution; and performing object recognition based on the image and the depth map.

The method may use a high resolution image camera and a low resolution depth map camera as opposed to a medium resolution hybrid image and depth map camera. In this way, the size and cost of the apparatus performing the method may be reduced and the efficiency of the object recognition may be increased.

The image camera may comprise an array of image pixels, the depth map camera comprises an array of depth map pixels, and a resolution of the array of image pixels is greater than a resolution of the array of depth map pixels.

The resolution of the array of image pixels may be between 1 Mpixels and 12 Mpixels and the resolution of the array of depth map pixels is between 0.4 kpixels and 308 kpixels.

The image pixels may be smaller than the depth map pixels.

The size of the image pixels may be comprised between 0.9 µm and 2 µm.

The size of the depth map pixels may be comprised between 2 µm and 30 µm.

The image pixels may comprise red pixels, green pixels and blue pixels.

The depth map pixels may comprise infrared pixels.

The infrared pixels may comprise Single Photon Avalanche Diodes (SPADs).

The image camera and the depth map camera may be arranged such that a field of view of the image camera and a field of view of the depth map camera are overlapping in an overlapping region.

The field of view of the image camera may be between 50° and 60°.

The field of view of the depth map camera may be comprised between 10° and 40°.

The image camera may comprise optics to direct light from the overlapping region toward a first array of pixels.

The image camera may comprise a filter to filter infrared light.

The depth map camera may comprise optics to direct light from the overlapping region toward the array of depth map pixels.

The depth map camera may comprise a filter to filter visible light.

The depth map camera may comprise an infrared light emitter to emit infrared light and optics to direct infrared light toward the overlapping region.

The image camera and the depth map camera may be arranged so that an optical axis of the image camera is coplanar with an optical axis of the depth map camera.

Performing object recognition based on the image and the depth map may comprise:

determining whether a detected object matches with a known object based on the image of the object.

Performing object recognition based on the image and the depth map may comprise: if the detected object matches with the known object, determining whether the detected object is two-dimensional or three-dimensional based on the depth map.

Performing object recognition based on the image and the depth map may comprise:

if the detected object is three-dimensional, determining whether the detected object matches the known object based on the depth map.

Determining whether the detected object matches the known object based on the depth map may comprise: determining a shape of the detected object based on the depth map; and comparing the shape of the detected object with a shape of the known object.

Determining whether the detected object matches the known object based on the depth map may comprise: determining features of the detected object based on the depth map; and comparing the features of the detected object with the features of the known object.

Determining whether the detected object matches the known object based on the depth map may comprise: determining positions of features of the detected object based on the depth map; and comparing the positions of the features of the detected object with the positions of features of the known object.

The method may comprise determining a distance between an apparatus and the detected object based on the depth map.

The method may comprise determining a shortest distance between an apparatus and the detected object based on the depth map.

The method may comprise determining a distance between an apparatus and a center of the detected object based on the depth map.

The method may comprise determining a size of the detected object based on the depth map.

The method may comprise determining a length of the detected object along a major axis and a width of the detected object along a minor axis.

The method may comprise: determining a tone of the detected object based on the image; and comparing the tone of the detected object with a tone of the known object.

The method may comprise upscaling the resolution of the depth map to match the resolution of the image.

The method may comprise aligning the depth map with the image based on the distance between the image camera and the depth map camera and the distance between an apparatus and the detected object.

The method may comprise: determining a position of the detected object in the depth map; and determining a position of the detected object in the image based on the position of the detected object in the depth map.

The method may comprise at least one of the following steps performed by the depth map camera: determining whether a detected object is two-dimensional or three-dimensional based on the depth map; determining whether a detected object matches a known object based on the depth map; determining the shape of a detected object based on the depth map and comparing the shape of the detected object with a shape of the known object; determining features of a detected object based on the depth map and comparing the features of the detected object with the features of the known object; determining the positions of features of a detected object based on the depth map and comparing the positions of the features of the detected object with the positions of features of the known object; determining a distance between the apparatus and a detected object based on the depth map; determining a shortest distance between the apparatus and a detected object based on the depth map; determining a distance between the apparatus and a center of a detected object based on the depth map; determining a size of a detected object based on the depth map; determining a length of a detected object along a major axis and a width of the detected object along a minor axis; upscaling the resolution of the depth map to match the resolution of the image; and determine a position of a detected object in the depth map.

By integrating at least some of the processing of the depth map directly into the depth map camera (e.g., same chip), the processing of the depth map may be less likely to be spoofed by a malicious user.

The method may comprise at least one of the following steps performed the image camera: determining whether a detected object matches with a known object based on the image; aligning the depth map with the image based on a distance between the image camera and the depth map camera and a distance between the apparatus and a detected object; determining a position of a detected object in the image based on a position of the detected object in the depth map; and determining a tone of a detected object based on the image and comparing the tone of the detected object with a tone of a known object.

By integrating at least some of the processing of the image directly into the image camera (e.g., same chip), the processing of the image may be less likely to be spoofed by a malicious user.

According to a fourth aspect, there is provided an apparatus for performing object recognition, the apparatus comprising: means for capturing a first resolution image with an image camera; means for capturing a second resolution depth map with a depth map camera; wherein the first resolution is greater than the second resolution; and means for performing object recognition based on the image and the depth map.

The apparatus may comprise a high resolution image camera and a low resolution depth map camera as opposed to a medium resolution hybrid image and depth map camera. In this way, the size and cost of the apparatus may be reduced and the efficiency of the object recognition may be increased.

The image camera may comprise an array of image pixels, the depth map camera comprises an array of depth map pixels, and a resolution of the array of image pixels is greater than a resolution of the array of depth map pixels.

The resolution of the array of image pixels may be between 1 Mpixels and 12 Mpixels and the resolution of the array of depth map pixels is between 0.4 kpixels and 308 kpixels.

The image pixels may be smaller than the depth map pixels.

The size of the image pixels may be comprised between 0.9 μm and 2 μm.

The size of the depth map pixels may be comprised between 2 μm and 30 μm.

The image pixels may comprise red pixels, green pixels and blue pixels.

The depth map pixels may comprise infrared pixels.

The infrared pixels may comprise Single Photon Avalanche Diodes (SPADs).

The image camera and the depth map camera may be arranged such that a field of view of the image camera and a field of view of the depth map camera are overlapping in an overlapping region.

The field of view of the image camera may be between 50° and 60°.

The field of view of the depth map camera may be comprised between 10° and 40°.

The image camera may comprise optics to direct light from the overlapping region toward the first array of pixels.

The image camera may comprise a filter to filter infrared light.

The depth map camera may comprise optics to direct light from the overlapping region toward the array of depth map pixels.

The depth map camera may comprise a filter to filter visible light.

The depth map camera may comprise an infrared light emitter to emit infrared light and optics to direct infrared light toward the overlapping region.

The image camera and the depth map camera may be arranged so that an optical axis of the image camera is coplanar with an optical axis of the depth map camera.

The means for performing object recognition based on the image and the depth map may comprise: means for determining whether a detected object matches with a known object based on the image of the object.

The means for performing object recognition based on the image and the depth map may comprise: if the detected object matches with the known object, means for determining whether the detected object is two-dimensional or three-dimensional based on the depth map.

The means for performing object recognition based on the image and the depth map may comprise: if the detected object is three-dimensional, means for determining whether the detected object matches the known object based on the depth map.

The means for determining whether the detected object matches the known object based on the depth map may comprise: means for determining a shape of the detected object based on the depth map; and comparing the shape of the detected object with a shape of the known object.

The means for determining whether the detected object matches the known object based on the depth map may comprise: means for determining features of the detected object based on the depth map; and means for comparing the features of the detected object with the features of the known object.

The means for determining whether the detected object matches the known object based on the depth map may comprise: means for determining positions of features of the detected object based on the depth map; and means for comparing the positions of the features of the detected object with the positions of features of the known object.

The apparatus may comprise means for determining a distance between an apparatus and the detected object based on the depth map.

The apparatus may comprise means for determining a shortest distance between an apparatus and the detected object based on the depth map.

The apparatus may comprise means for determining a distance between an apparatus and a center of the detected object based on the depth map.

The apparatus may comprise means for determining a size of the detected object based on the depth map.

The apparatus may comprise means for determining a length of the detected object along a major axis and a width of the detected object along a minor axis.

The apparatus may comprise: means for determining a tone of the detected object based on the image; and means for comparing the tone of the detected object with a tone of the known object.

The apparatus may comprise means for upscaling the resolution of the depth map to match the resolution of the image.

The apparatus may comprise means for aligning the depth map with the image based on the distance between the image camera and the depth map camera and the distance between an apparatus and the detected object.

The apparatus may comprise: means for determining a position of the detected object in the depth map; and means for determining a position of the detected object in the image based on the position of the detected object in the depth map.

The apparatus may comprise at least one of the following performed by the depth map camera: determining whether a detected object is two-dimensional or three-dimensional based on the depth map; determining whether a detected object matches a known object based on the depth map; determining the shape of a detected object based on the depth map and comparing the shape of the detected object with a shape of the known object; determining features of a detected object based on the depth map and comparing the features of the detected object with the features of the known object; determining the positions of features of a detected object based on the depth map and comparing the positions of the features of the detected object with the positions of features of the known object; determining a distance between the apparatus and a detected object based on the depth map; determining a shortest distance between the apparatus and a detected object based on the depth map; determining a distance between the apparatus and a center of a detected object based on the depth map; determining a size of a detected object based on the depth map; determining a length of a detected object along a major axis and a width of the detected object along a minor axis; upscaling the resolution of the depth map to match the resolution of the image; and determine a position of a detected object in the depth map.

By integrating at least some of the processing of the depth map directly into the depth map camera (e.g., same chip), the processing of the depth map may be less likely to be spoofed by a malicious user.

The apparatus may comprise at least one of the following performed the image camera: determining whether a detected object matches with a known object based on the image; aligning the depth map with the image based on a distance between the image camera and the depth map camera and a distance between the apparatus and a detected object; determining a position of a detected object in the image based on a position of the detected object in the depth map; and determining a tone of a detected object based on the image and comparing the tone of the detected object with a tone of a known object.

By integrating at least some of the processing of the image directly into the image camera (e.g., same chip), the processing of the image may be less likely to be spoofed by a malicious user.

According to a fifth aspect, there is provided a computer program comprising instructions which, when the program is executed by a computer, cause the computer to carry out any one of the above methods.

BRIEF DESCRIPTION OF THE SEVERAL VIEWS OF THE DRAWINGS

Reference will now be made, by way of example only, to the accompanying drawings in which:

FIG. 9 shows a block diagram of an apparatus according to an embodiment disclosed herein.

DETAILED DESCRIPTION

Figure 1:
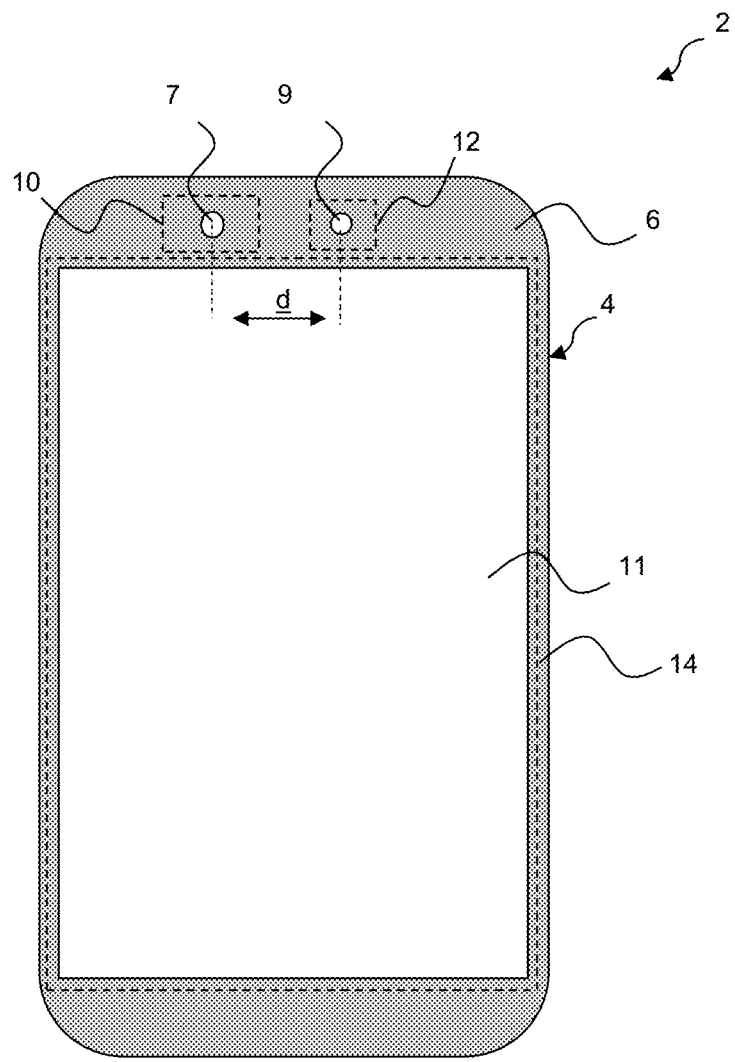
FIG. 1 shows a front view of an apparatus according to an embodiment disclosed herein.
Figure 2:
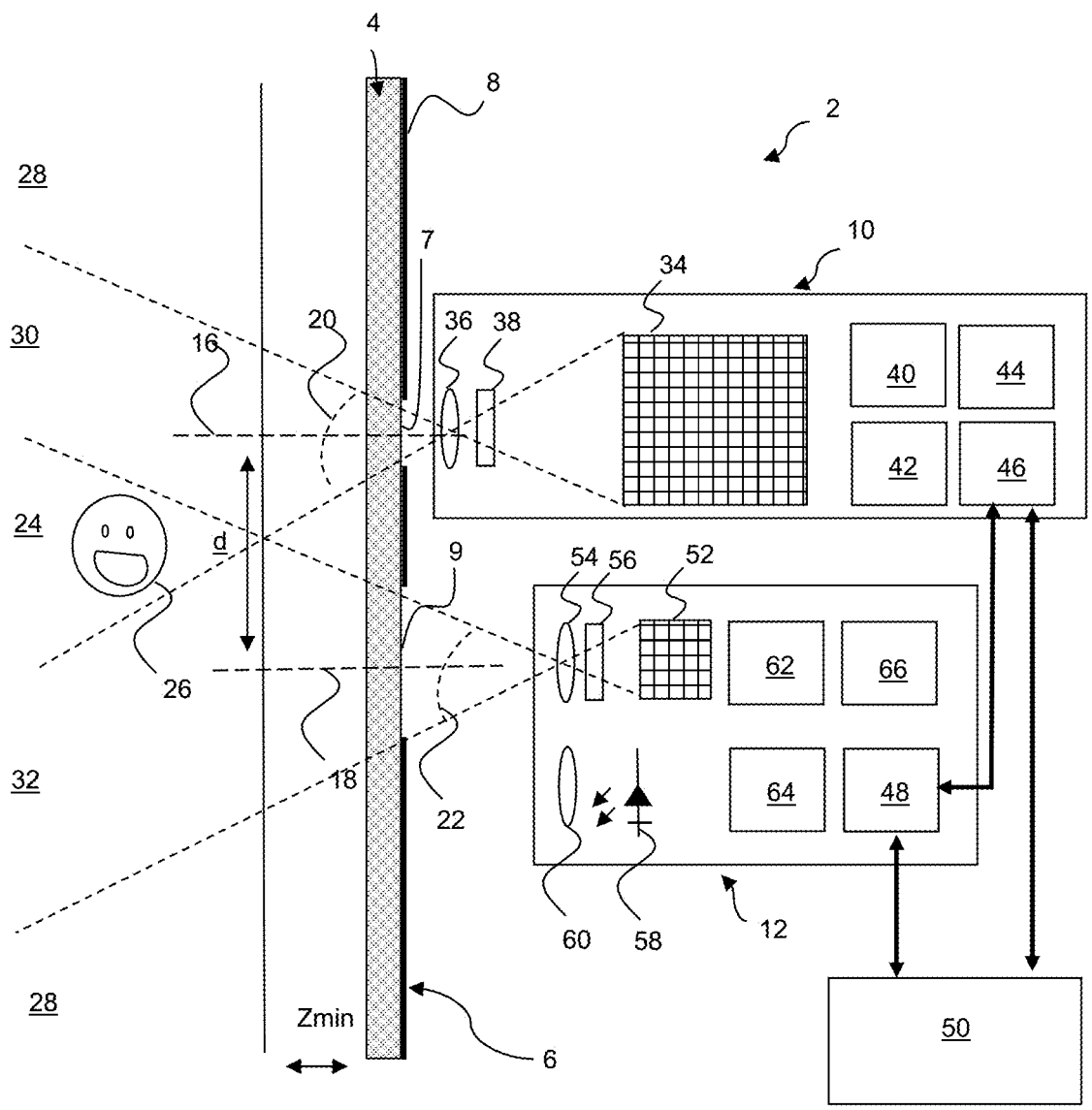
FIG. 2 shows a side view of an apparatus according to an embodiment disclosed herein.

FIGS. 1 and 2 show an apparatus 2 according to an embodiment disclosed herein. For example, the apparatus 2 may be part of a larger system such as a smart card reader, a mobile phone, a tablet computer, a laptop computer, a desktop computer, a smart watch, a video game console, etc.

The apparatus 2 comprises a housing. The housing comprises a front part 4 and a rear part (not represented). The front part 4 is made of glass and is transparent (e.g., has a transmittance greater than or equal to 90%) to both visible light (e.g., 400 nm to 700 nm wavelengths) and infrared light (e.g., 800 nm to 990 nm wavelength). For example, the front part 4 may be made of alkali-aluminosilicate sheet glass to improve the impact resistance.

The front part 4 comprises an external face orientated toward the outside of the apparatus 2 and an internal face orientated toward the inside of the apparatus 2. The internal face includes a coated area 6 coated with an ink 8 to prevent the internal face from being damaged by scratches. The ink 8 may be transparent (e.g., transmittance between 1% and 50%) to infrared light. The internal face also includes non-coated areas 7, 9 and 11 respectively in the optical paths of an image camera 10, a depth-map camera 12 and a screen 14.

The image camera 10 and the depth-map camera 12 are typically located at the top of the apparatus 2 so that they are not obstructed when the user holds the apparatus 2.

The image camera 10 comprises a first optical axis 16. The depth map 12 camera comprises a second optical axis 18. The image camera 10 and the depth map camera 12 are arranged so that the first and second optical axes 16, 18 are distant by a distance d. The image camera 10 and the depth map camera 12 are also arranged so that the first and second optical axes 16, 18 are parallel. In this way, the image planes of the image camera 10 and the depth map camera 12 are coplanar.

The image camera 10 comprises a first field of view 20. The depth map camera 12 comprises a second field of view 22. The image camera 10 and the depth map camera 12 are arranged so that the first and second fields of views 20, 22 overlap within an overlapping region 24.

As can be seen, in the overlapping region 24 an object, such as a face 26 of a user, can be captured by both the image camera 10 and the depth map camera 12. In a non-overlapping region 28 outside the first and second fields of views 20, 22 a face cannot be captured neither by the image camera 10 nor by the depth image camera 12. In a non-overlapping region 30 inside the first field of view 20 but outside the second field of view 22 a face can only be captured by the image camera 10. In a non-overlapping region 32 outside the first field of view 20 but inside the second field of view 22 a face can only be captured by the depth map camera 12.

It will be understood that the overlapping region 24 is bounded and there is a minimum distance Zmin between the face 26 and the apparatus 2. The distance d between the first and second optical axes 16, 18 of the image camera 10 and the depth map camera 12 and the first and second fields of view of the image camera 10 and the depth map camera 12 are selected so that the distance Zmin is acceptable. For example, a distance Zmin greater than or equal to 10 cm is acceptable as it is unlikely that a user will hold the apparatus 2 closer than this. Indeed, the human eye is uncomfortable focusing on objects this close. The distance Zmin is typically equal to 20 cm.

The first field of view 20 of the image camera 10 is typically greater than the second field of view 22 of the depth map camera 12. For example, the first field of view 20 of the image camera 10 may be between 50° and 60° which allows capturing a large scene without the distortion associated with wider fields of view. The second field of view 22 of the depth map camera 12 may be between 10° and 40°. The infrared photons flux density is reduced with wider field of views and it becomes harder to differentiate between infrared photons from ambient light and infrared photons from an infrared emitter.

The image camera 10 comprises an array 34 of red pixels, green pixels and blue pixels. The resolution of the array 34 of red pixels, green pixels and blue pixels is typically between 1 Mpixels and 2 Mpixels.

Each red pixel, green pixel and blue pixel typically comprises a photodiode and transistors (e.g., 4T, 1T75, 1T5 architecture). Each red pixel, green pixel and blue pixel typically has a size between 1 µm and 2 µm.

The image camera 10 comprises optics 36 (e.g., one or more lenses or mirrors) to direct light from the overlapping region 24 to the array 34 of red pixels, green pixels and blue pixels.

The image camera 10 comprises a filter 38 to filter (i.e., block) infrared light. The filter 38 may be part of the optics 36 or separate from the optics 36. For example, the filter 38 may be a coating applied on the optics 36.

Alternatively, the image camera 10 does not comprise the filter 38. Instead, the filter 38 is part of the front part 4 of the housing. For example, the filter 38 may be a coating applied on the internal face of the front part 4 of the housing.

The image camera 10 comprises a readout unit 40 configured to selectively readout the red pixels, green pixels and blue pixels. The readout unit 40 typically comprises circuitry to generate a periodic reset pulse, read pulse and transfer gate pulse (TG) (e.g., TG for 4T architecture, not 3T pixels). The time between the reset pulse and TG/READ controls the exposure/integration time of the pixel. In a 4T pixel, the sense node is preferably reset shortly before the TG pulse and the pixel read out and this value is used as part of a correlated double-sampling operation to remove the reset (kTC) noise of the sense node by subtracting this signal from that obtained after the TG pulse.

The image camera 10 comprises a control unit 42 configured to selectively control the red pixels, green pixels and blue pixels. The control unit 42 typically comprises circuitry to generate reset, TG and read pulses for each row of the pixel, also pulses for controlling the operation of any sample/hold and/or analog to digital (ADC) circuitry. Preferably, the control circuit monitors the signals generated by the array and adaptively adjusts their timing to ensure optimal exposure (i.e., pixels are not saturated). Preferably, the range of the ADC is adjusted to suit the range of voltages obtained by reading out the pixel array. This operation may include a programmable gain amplifier (PGA) between the pixel output of the ADC or preferably changing the voltage swing of a reference signal (e.g., ramp which is connected to one input of a comparator and the other signal of the comparator is connected to the array output). Optionally, the control unit 42 can enable/disable suitable clamping circuitry which limits the voltage excursion of the signals output from the pixel array.

In this way, the image camera 10 is able to capture an image comprising a red channel, a green channel and a blue channel.

The image camera 10 comprises a memory unit 44 and a processing unit 46. The memory unit 44 stores instructions which, when executed by the processing unit 46, allow the processing unit 46 to process an image and perform one or more of the steps of the methods of FIGS. 3 to 8 (discussed in further details below). The instructions may be stored during manufacture in a non-volatile part of the memory unit 44 or after manufacture (e.g., uploaded) in a volatile part of the memory unit 44. Preferably, the instructions are signed with a cryptographic key so that unauthorized instructions cannot be executed by the processing unit 46.

More specifically, the processing unit 46 may be configured to detect a face based on an image.

The processing unit 46 may be configured to determine whether a detected face matches with a known face based on an image.

The processing unit 46 may be configured to determine the shape of a detected face based on an image and compare the shape of the detected face with a shape of a known face stored in the memory unit 44. The shape of a face may typically be a prolate spheroid.

The processing unit 46 may be configured to determine features of a detected face based on an image and compare the features of the detected face with the features of a known face stored in the memory unit 44. The features of a face may typically comprise a mouth, a nose, ears or eye sockets, etc.

The processing unit 46 may be configured to determine positions of features of a detected face based on an image and compare the positions of the features of the detected face with the positions of features of a known face stored in the memory unit 44. The positions of the features may comprise relative positions (e.g., positions of the features with regard to one another or with regard to the center of the face) or absolute positions (e.g., positions in the field of view 20 of the image camera 10).

The processing unit 46 may be configured to align a depth map with an image knowing the distance d between the optical axes 16, 18 of the image camera 10 and the depth map camera 12 and the distance Z between the apparatus 2 and a detected face.

The processing unit 46 may be configured to determine a position of a detected face in an image based on a position of a detected face in a depth map.

The processing unit 46 may be configured to determine a skin tone of a detected face based on an image and compare the skin tone of the detected face with a skin tone of a known face stored in the memory unit 44.

The processing unit 46 may be configured to communicate with a processing unit 48 of the depth map camera 12 or with a central processing unit 50 of the apparatus 2 via a bus. For example, the bus may be an Inter Integrated Circuit (I2C) bus or a Serial Peripheral (SPI) bus.

The image camera 10 (e.g., array 34 of red pixels, green pixels, blue pixels, optics 36, filter 38, readout unit 40, control unit 42, memory unit 44 and processing unit 46) are preferably integrated on a single chip. In this way, the processing of the depth map is less likely to be spoofed by a malicious user.

It will however be understood that the components of the image camera 10 could also be integrated on separate chips.

The depth map 12 comprises an array 52 of infrared time-of-flight pixels. The resolution of the array 52 of infrared time-of-flight pixels may be lower than the resolution of the array 34 of red pixels, green pixels and blue pixels of the image camera 10. The resolution of the array 52 of infrared time-of-flight pixels is typically between 0.4 kpixels and 308 kpixels.

Each infrared time-of-flight pixel typically comprises a Single Photon Avalanche Diode (SPAD). Again, SPADs are well-known in the art and therefore their functioning is not discussed in detail. Each infrared time-of-flight pixel of the depth map camera 12 may be larger than the red pixels, green pixels and blue pixels of the image camera 10. Each infrared time-of-flight typically has a size between 2 µm and 30 µm.

The depth map camera 12 comprises optics 54 (e.g., one or more lenses or mirrors) to direct light from the overlapping region 24 to the array 52 of infrared time-of-flight pixels.

The depth map camera 12 comprises a filter 56 to filter (i.e., block) visible light. The filter 56 may be part of the optics 54 or separate from the optics 54. For example, the filter 56 may be a coating applied on the optics 54.

Alternatively, the depth map camera 54 does not comprise the filter 56. Instead, the filter 56 is part of the front part 4 of the housing. For example, the filter 56 may be a coating applied on the internal face of the front part 4 of the housing.

In an implementation, the non-coated area 9 on the internal face of the front part 4 of the housing is replaced by a coated area 9 coated with the ink 8 and the ink 8 is transparent (e.g., transmittance greater than or equal to 10%) to infrared light while blocking (e.g., transmittance lower than 10%) visible light.

The depth map camera 12 comprises an infrared emitter 58 to emit infrared light and optics 60 (e.g., one or more lenses or mirrors) to direct infrared light toward the overlapping region 24.

The depth map camera 12 comprises a readout unit 62 configured to selectively readout the infrared time-of-flight pixels. Reading out an infrared time-of-flight pixel typically comprises detecting a pulse generated by the absorption of an infrared photon, determining a time-of-flight of the photon assuming that the photon was generated by the infrared light emitter 58 and reflected by the face 26, determining a distance between the apparatus 2 and the face 26 and generating a value indicative of a distance Z between the apparatus 2 and the face 26.

The depth map camera 12 comprises a control unit 64 configured to selectively control the infrared time-of-flight pixels. Controlling an infrared time-of-flight pixel typically comprises quenching and resetting the pixel after generating a pulse.

In this way, the depth map camera 12 is able to capture a depth map comprising a depth or distance or Z channel.

The depth map camera 12 comprises a memory unit 66 and the processing unit 48. The memory unit 66 stores instructions which when executed by the processing unit 48 allow the processing unit 48 to process a depth map and perform one or more of the steps of the methods of FIGS. 3 to 8 (discussed in further details below). The instructions may be stored during manufacture in a non-volatile part of the memory unit 66 or after manufacture (e.g., uploaded) in a volatile part of the memory unit 66. Preferably, the instructions are signed with a cryptographic key so that unauthorized instructions cannot be executed by the processing unit 48.

More specifically, the processing unit 48 may be configured to detect a face based on a depth map.

The processing unit 48 may be configured to determine whether a detected face is two-dimensional or three-dimensional based on a depth map.

The processing unit 48 may be configured to determine whether a detected face matches with a known a face based on a depth map.

The processing unit 48 may be configured to determine the shape of a detected face based on a depth map and compare the shape of the detected face with a shape of a known face stored in the memory unit 66. The shape of a face may typically be a prolate spheroid.

The processing unit 48 may be configured to determine features of a detected face based on a depth map and compare the features of the detected face with the features of a known face stored in the memory unit 66. The features of a face may typically comprise a mouth, a nose, ears or eye sockets, etc.

The processing unit 48 may be configured to determine positions of features of a detected face based on a depth map and compare the positions of the features of a detected face with the positions of features of a known face stored in the memory unit 66. The positions of the features may comprise relative positions (e.g., positions of the features with regard to one another or with regard to the center of the face) or absolute positions (e.g., positions in the field of view 22 of the depth map camera 12).

The processing unit 48 may be configured to determine a distance between the apparatus 2 and a detected face based on the depth map.

The processing unit 48 may be configured to determine a shortest distance between the apparatus 2 and a detected face based on the depth map.

The processing unit 48 may be configured to determine a distance between the apparatus 2 and a center of a detected face based on a depth map.

The processing unit 48 may be configured to determine a size of a detected face based on a depth map.

The processing unit 48 may be configured to determine a length of a detected face along a major axis (i.e., top to bottom or chin to forehead) and a width of a detected face along a minor axis (i.e., left to right or ear to ear).

The processing unit 48 may be configured to upscale the resolution of a depth map to match the resolution of an image.

The processing unit 48 may be configured to determine a position of a detected face in a depth map.

The processing unit 48 may be configured to communicate with the processing unit 46 of the image camera 10 or with the central processing unit 50 of the apparatus 2 via a bus. For example, the bus may be an Inter Integrated Circuit (I2C) bus or a Serial Peripheral (SPI) bus.

FIGS. 3 to 8 show flow diagrams of various methods that can be implemented by the apparatus 2. It will be understood that these methods can be combined or that other method can be implemented by the apparatus 2 without falling outside of the scope of the claims.

Figure 3:
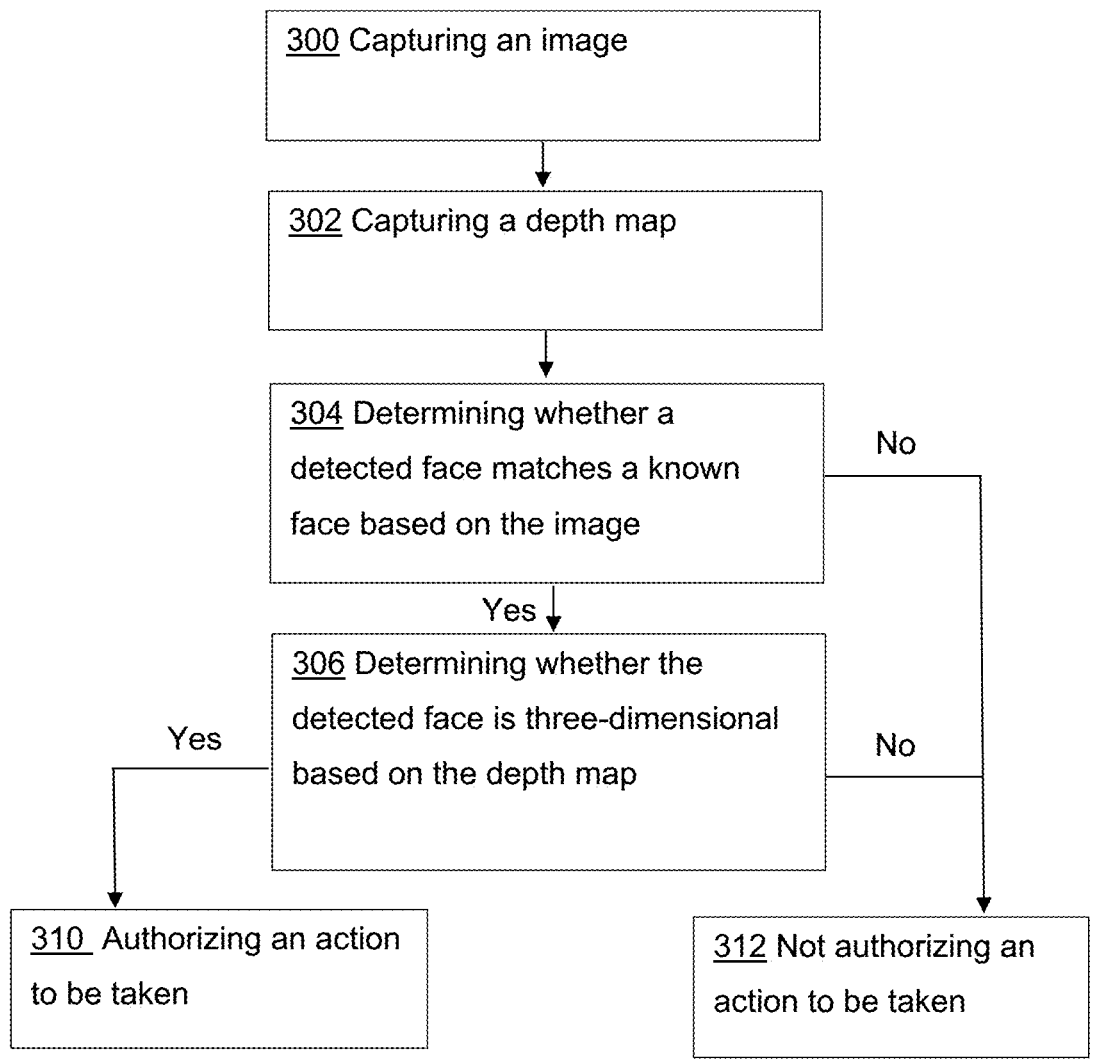
FIGS. 3 to 8 show flow diagrams of various methods according to embodiments disclosed herein.

FIG. 3 shows a flow diagram of a first method that can be implemented by the apparatus 2.

Initially, a user holds the apparatus 2 so that the face 26 is located within the overlapping region 24.

In step 300, the image camera 10 captures an image.

In step 302, the depth map camera 12 captures a depth map.

In step 304, the processing unit 46 of the image camera 10 detects a face and determines whether the detected face matches with a known face based on the captured image.

If the processing unit of the image camera determines that the detected face matches with a known face, the method proceeds to step 306.

If the processing unit of the image camera determines that the detected face does not match with a known face, the method proceeds to step 312.

In step 306 (i.e., the detected face matches with a known face), the processing unit 48 of the depth map camera 12 determines whether the detected face is two-dimensional or three-dimensional. It will be understood that if each feature of the detected face is at substantially the same distance to the apparatus 2, the detected face is two-dimensional. Otherwise, the detected face is three-dimensional. In this way, the processing unit 46 of the image camera 10 may determine whether a fraudulent user is presenting a picture of a face to the apparatus 2.

If the detected face is three-dimensional the method proceeds to step 310. If the detected face is two-dimensional the method proceeds to step 312.

In step 310 (i.e., the detected face matches with a known face AND the face is three-dimensional), the processing unit 48 of the depth map camera 12 communicates an indication to the processing unit 46 of the image camera 10 or to the central processing unit 50 of the apparatus 2 that the detected face is three-dimensional. In response, the processing unit 46 of the image camera 10 or the central processing unit 50 of the apparatus 2 authorizes an action to be taken. For example, the action may be to unlock the apparatus 2 or to authorize a payment.

In step 312, (i.e., the detected face does not match with a known face OR the detected face is two-dimensional), the processing unit 48 of the depth map camera 10 communicates an indication to the processing unit 46 of the image camera 10 or the central processing unit 50 of the apparatus 2 that the detected face is two-dimensional. In response, the processing unit 46 of the image camera 10 or the central processing unit 50 of the apparatus 2 does not authorize the action to be taken.

The indication may a bit communicated via the I2C bus or SPI bus. Alternatively, the indication may a bit communicated via a dedicated input/output line or via a register accessible by the processing unit 46 of the image camera 10 or the central processing unit 50 of the apparatus 2.

The method of FIG. 3 is advantageous because it requires minimum computing, memory and power resources to perform face recognition. Indeed, the processing unit 48 of the depth map camera 12 only performs a security check. It does not determine whether the detected face matches with a known face based on the depth map.

Figure 4:
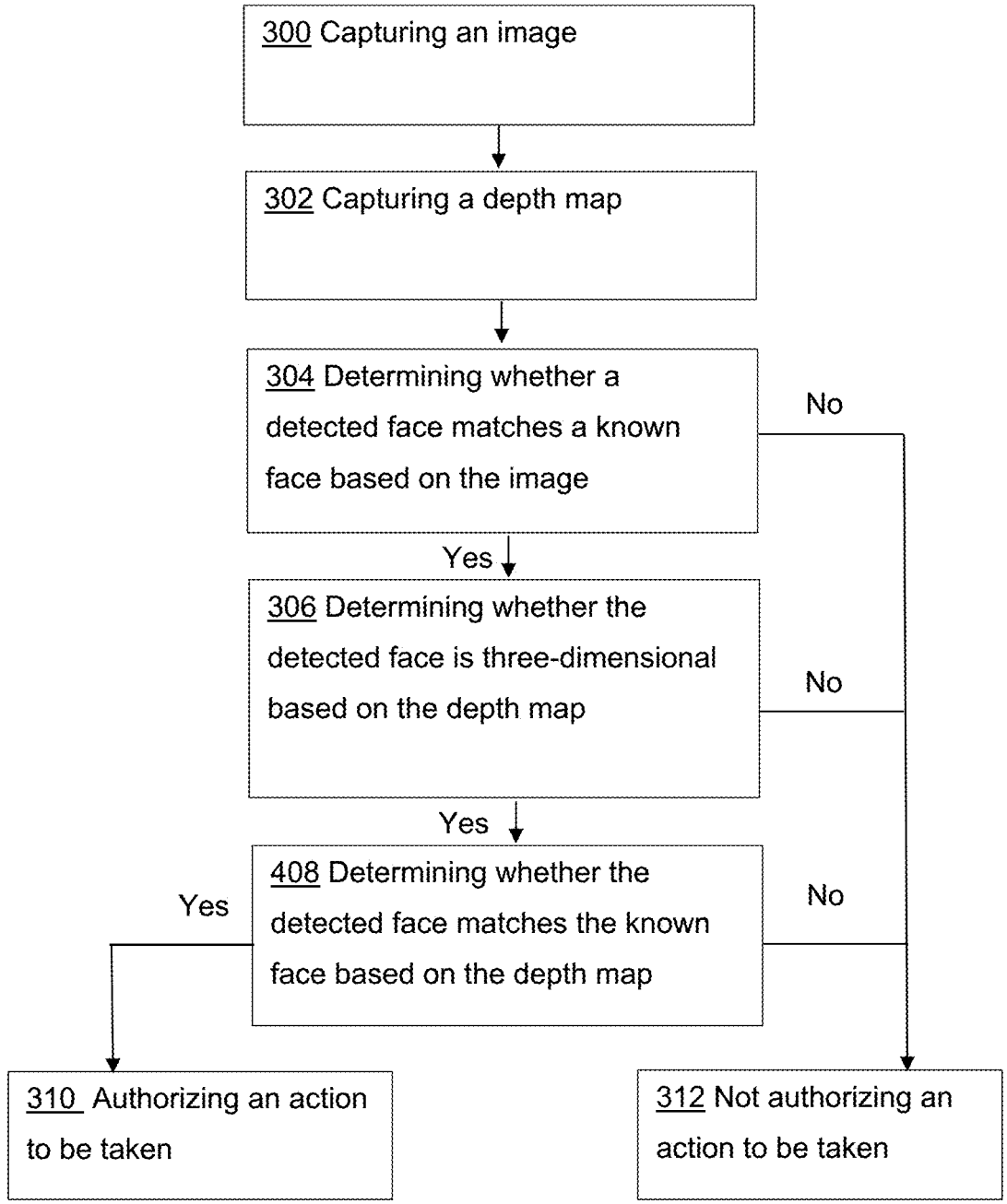

FIG. 4 shows a flow diagram of a second method that can be implemented by the apparatus 2. The method of FIG. 4 is identical to the method of FIG. 3 except that it comprises an additional step 408.

In step 408 (i.e., the detected face does not match with a known face AND the detected face is three-dimensional), the processing unit 48 of the depth map camera 12 determines whether the detected face matches with a known face based on the depth map.

If the detected face matches with a known face the method proceeds to step 310. If the detected face does not match with a known face the method proceeds to step 312.

The method of FIG. 4 is more reliable than the method of FIG. 3 because the processing unit 48 of the depth map camera 12 not only performs a security checks but also determines whether the detected face matches with a known face.

Figure 5:
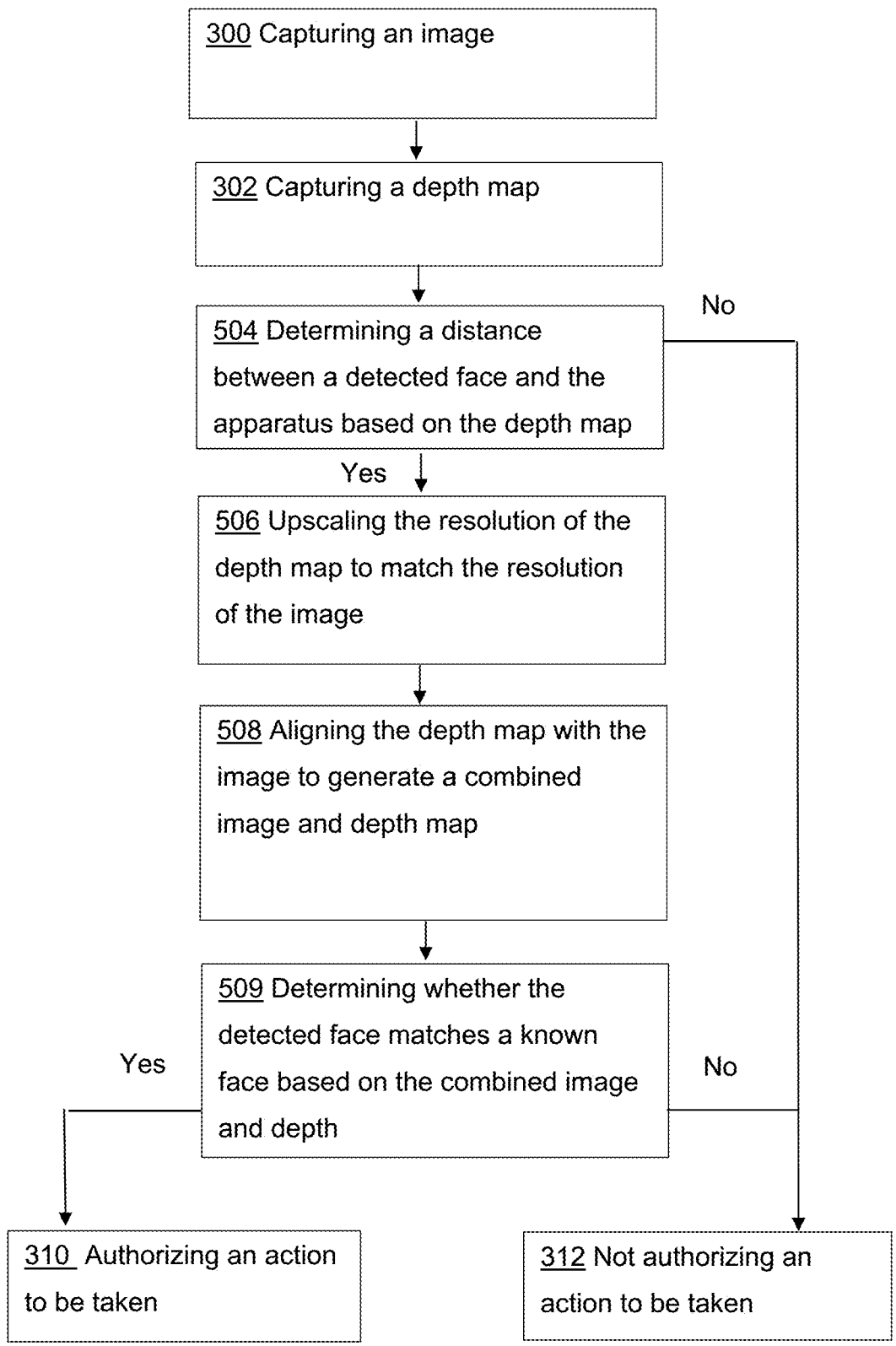

FIG. 5 shows a flow diagram of a third method that can be implemented by the apparatus 2. The method of FIG. 5 is identical to the method of FIG. 3 except that the steps 304 and 306 are replaced by steps 504, 506, 508 and 509.

In step 504, the processing unit 48 of the depth map camera 12 detects a face and determines a distance Z between the detected face and the apparatus 2 based on the depth map. The processing unit 48 of the depth map camera 12 communicates the distance to the processing unit 46 of the image camera 10 or the central processing unit 50 of the apparatus 2.

In step 506, the processing unit 48 of the depth map camera 12 upscales the resolution of the depth map to match the resolution of the image. The processing unit 48 of the depth map camera 12 communicates the upscaled depth map to the processing unit 46 of the image camera 10 or the central processing unit 50 of the apparatus 2.

In step 508, the processing unit 46 of the image camera 10 or the central processing unit 50 of the apparatus 2 aligns the upscaled depth map and the image to generate a combined image and depth map comprising a Red channel, a Green channel, a Blue channel and depth or distance or Z channel).

It will be understood that such aligning can be performed because the processing unit 46 of the image camera 10 or the central processing unit 50 of the apparatus 2 knows the distance d between the optical axes 16, 18 of the image camera 10 and the depth map camera 12, the fields of view 20, 22 of the image camera 10 and the depth map camera 12, and the distance Z between the detected face and the apparatus 2.

In step 509, the processing unit 46 of the image camera 10 or the central processing unit 50 of the apparatus 2 determines whether the detected face matches with a known face based on the combined image and depth map.

Figure 6:
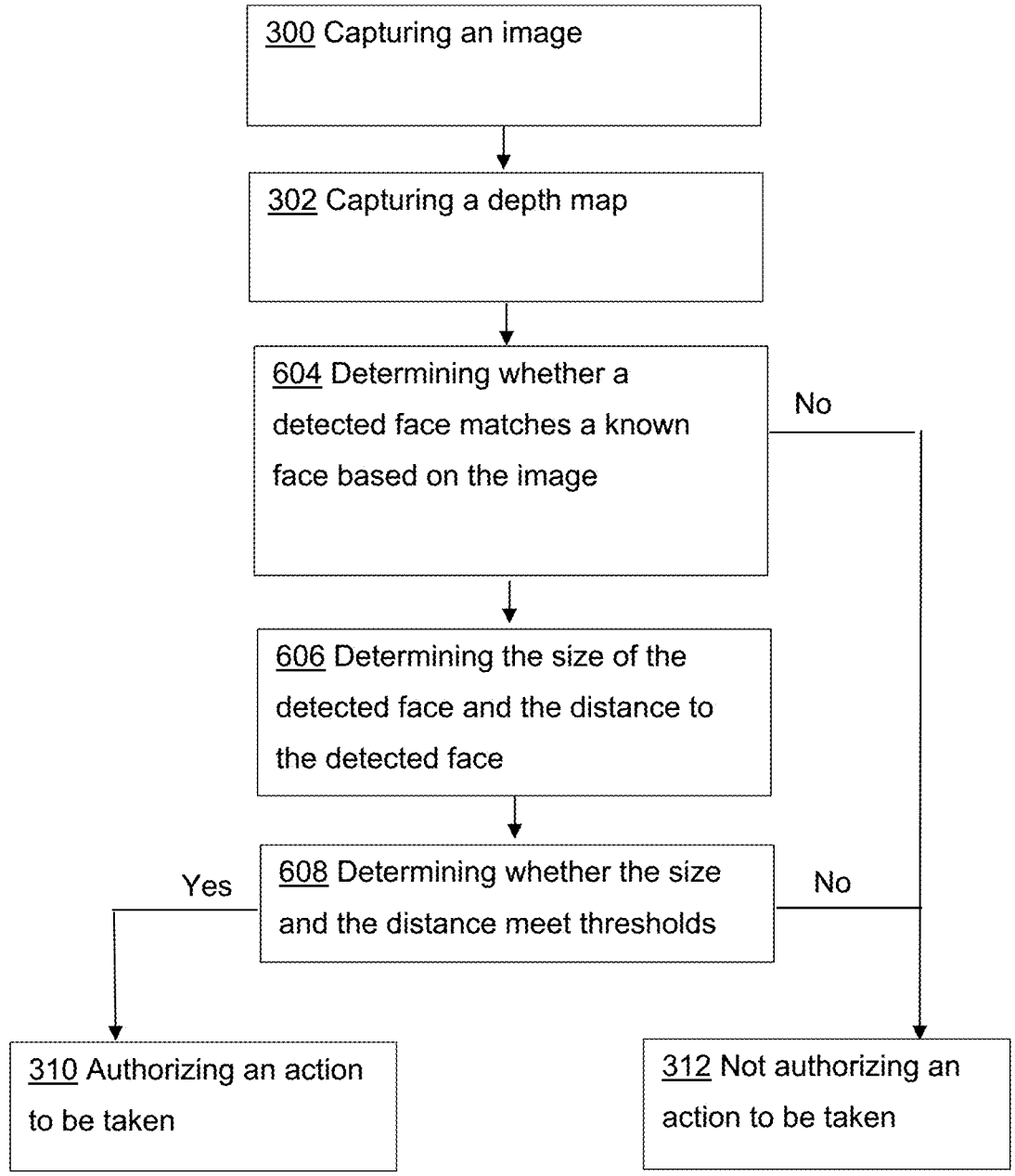

FIG. 6 shows a flow diagram of a fourth method that can be implemented by the apparatus 2. The method of FIG. 6 is identical to the method of FIG. 3 except that the steps 304 and 306 are replaced by steps 604, 606 and 608.

In step 604, the processing unit 46 of the image camera 10 detects a face and determines whether the detected face match with a known face based on the image and the depth map (e.g., as discussed above).

If the detected face matches with a known face, the method proceeds to step 606. If the detected face does not match with a known face, the method proceeds to step 312.

In step 606 (i.e., the detected face matches with a known face), the processing unit 48 of the depth map camera 12 checks whether it can also detect the face and, if so, determines a size of the detected face and determines a distance Z to the detected face. The processing unit 48 of the depth camera 12 communicates the result of the detection, the size and the distance to the processing unit 46 of the image camera 10 or the central processing unit 50 of the apparatus 2.

In the event that the processing unit 48 depth map camera 12 does not detect the face (e.g., the face is located within the non-overlapping region 30 and therefore can only be detected by the processing unit 46 of the image camera 10) then the size and the distance communicated may be a default size (e.g., 0 or bignum representing some default size) and a default distance (e.g., 0, Zmin, Zmin–Δ, bignum representing some default distance).

In step 608, the processing unit 46 of the image camera 10 determines whether the size and the distance meet some thresholds (e.g., the size is within an acceptable size range and the distance is within an acceptable distance range).

If the processing unit 46 of the image camera 10 determines that the size and the distance meet the thresholds, the method proceeds to step 310. If the processing unit 46 of the image camera 10 determines that the size and the distance do not meet the thresholds, the method proceeds to step 312.

Figure 7:
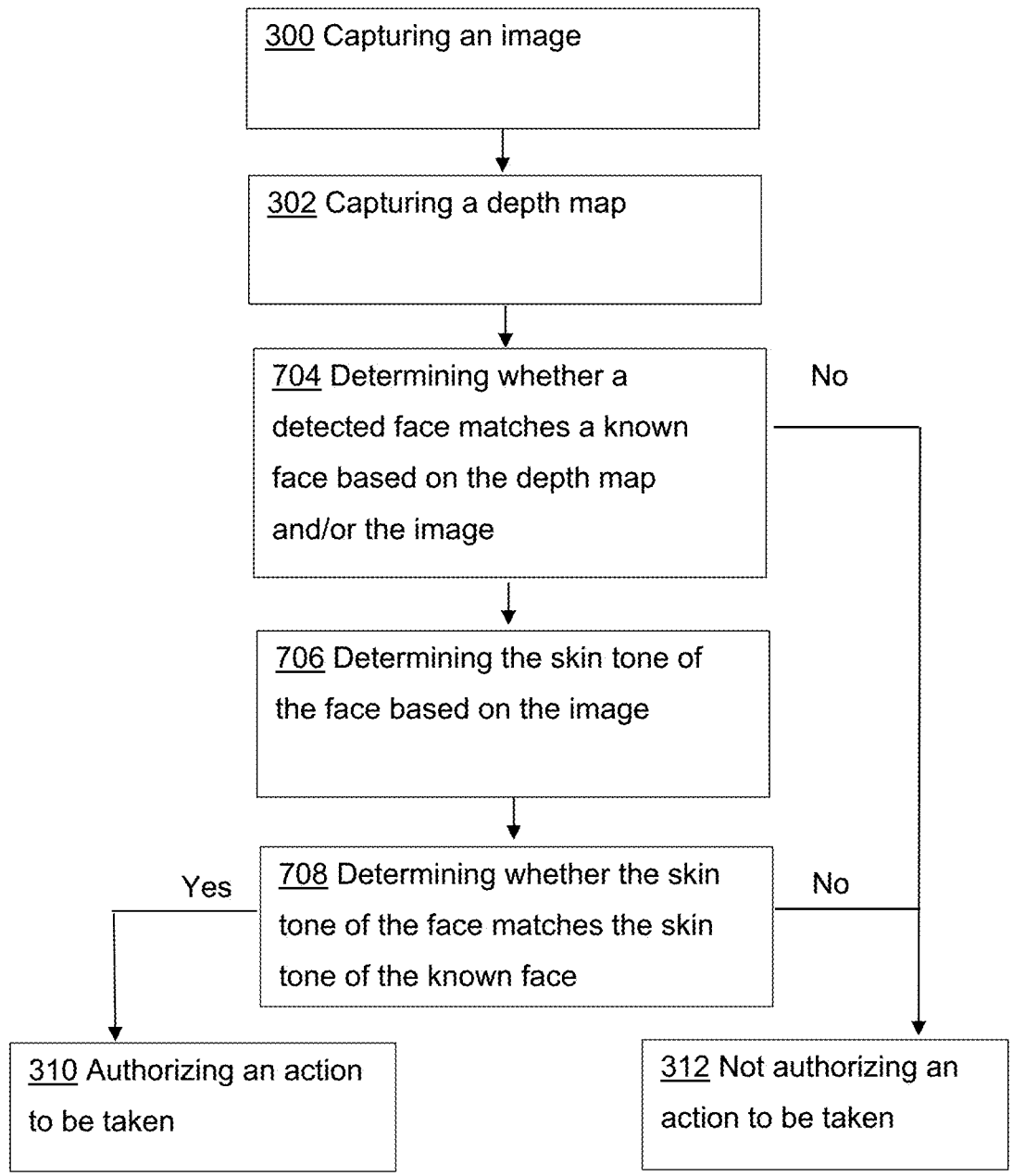

FIG. 7 shows a flow diagram of a fifth method that can be implemented by the apparatus 2. The method of FIG. 7 is identical to the method of FIG. 3 except that the steps 304 and 306 are replaced by steps 704, 706 and 708.

In step 704, the processing unit 46 of the image camera 10 and/or the processing unit 48 of the depth map camera 12 detect a face and determine whether the detected face match with a known face based on the image and/or the depth map.

If the detected face matches with a known face, the method proceeds to step 706. If the detected face does not match with a known face, the method proceeds to step 312.

In step 706 (i.e., the detected face matches with a known face), the processing unit 46 of the image camera 10 determines a skin tone of the detected face based on the image.

In step 708, the processing unit 46 of the image camera 10 determines whether the skin tone of the detected face matches with the skin tone of the known face.

If the skin tone of the detected face matches with the skin tone of the known face, the method proceeds to step 310. If the skin tone of the detected face does not match with the skin tone of the known face, the method proceeds to step 312.

In this way, the processing unit 46 of the image camera 10 ensures that a malicious user is not merely presenting a two-dimensional or three-dimensional representation (e.g., a picture, a cast, a printed model) of a face to the apparatus 2.

Figure 8:
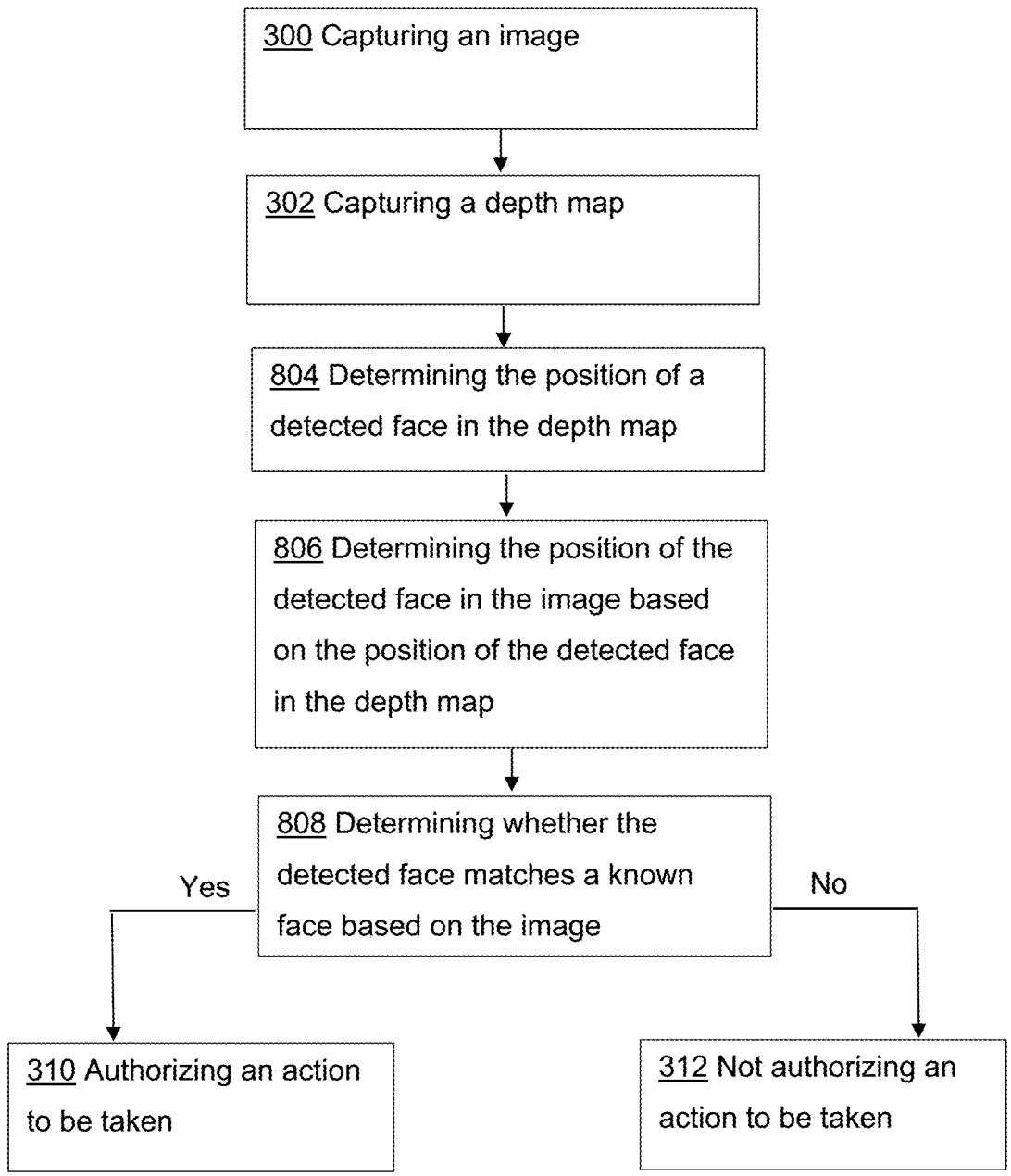

FIG. 8 shows a flow diagram of a sixth method that can be implemented by the apparatus 2. The method of FIG. 8 is identical to the method of FIG. 3 except that the steps 304 and 306 are replaced by steps 804, 806 and 808.

In step 804, the processing unit 48 of the depth map camera 12 detects a face and determines a position of the detected face in the depth map. The processing unit 48 of the depth map camera communicates the position of the detected face in the depth map to the processing unit 46 of the image camera 10 or the central processing unit 50 of the apparatus 2.

The processing unit 48 of the depth map camera 12 also determines a distance Z between the detected face and the apparatus 2. The processing unit 48 of the depth map camera 12 communicates the distance between the detected face and the apparatus 2 to the processing unit 46 of the image camera 10 or the central processing unit 50 of the apparatus 2.

In step 806, the processing unit 46 of the image camera 10 or the central processing unit 50 of the apparatus 2 determines a position of a detected face in the image based on the position of the detected face in the depth map.

It will be understood that the position of the detected face in the depth map may be derived knowing the distanced between the optical axes 16, 18 of the image camera 10 and the depth map camera 12, the fields of view 20, 22 of the image camera 10 and the depth map camera 12 and the distance Z between the detected face and the apparatus 2.

In step 808, the processing unit 46 of the image camera determines whether the detected face matches a known face based on the image.

In this way, the apparatus 2 may initiate face recognition using the depth map camera (e.g., low consumption mode) and then complete face recognition using the image camera (e.g., high consumption mode).

It will also be understood that in the above methods the steps performed by the processing unit 46 of the image camera 10 and/or the steps performed by processing unit 48 of the depth map camera 12 could equally be performed by the central processing unit 50 of the apparatus 2.

FIG. 9 shows a block diagram summarizing the structure of an apparatus according to an embodiment.

The apparatus comprises a component 902 for capturing an image. The apparatus comprises a component 904 for capturing a depth map. The apparatus comprises a component 906 for determining whether a detected face matches a known face based on an image. The apparatus comprises a component 908 for determining whether a detected face matches a known face based on a depth map. The apparatus comprises a component 910 for upscaling the resolution of a depth map to match the resolution of an image. The apparatus comprises a component 912 for aligning a depth map with an image to generate a combined image and depth map. The apparatus comprises a component 914 for determining a size of a detected face and a distance to a detected face based on a depth map. The apparatus comprises a component 916 for determining whether a detected face matches a known face based on a combined image and depth of the face. The apparatus comprises a component 918 for determining a skin tone of a detected face based on an image. The apparatus comprises a component 920 for determining a position of a detected face in a depth map. The apparatus comprises a component 922 for determining a position of a detected face in an image based on a position of the detected face in a depth map.

It will be understood that the components 906 to 922 may be implemented in hardware and/or in software.

Various embodiments with different variations have been described here above. It should be noted that those skilled in the art may combine various elements of these various embodiments and variations.

Such alterations, modifications, and improvements are intended to be part of this disclosure, and are intended to be within the scope of the claims. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. An apparatus for performing object recognition, the apparatus comprising:
  an image camera to capture a first resolution image;
  a depth map camera to capture a second resolution depth map, wherein the first resolution is greater than the second resolution; and processing circuitry configured to:
    determine whether a detected face matches a known face based on the image and the depth map; and
    responsive to a determination that the detected face matches the known face, determine whether the detected face is two-dimensional or three-dimensional, wherein the processing circuitry is configured to:
align the depth map with the image based on a distance between the image camera and the depth map camera and the distance between the apparatus and the detected face; and
determine a tone of the detected face based on the image and compare the tone of the detected face with a tone of the known face.

2. The apparatus according to claim 1, wherein the image camera comprises an array of image pixels, the depth map camera comprises an array of depth map pixels, and a resolution of the array of image pixels is greater than a resolution of the array of depth map pixels.

3. The apparatus according to claim 2, wherein the resolution of the array of image pixels is between 1 Mpixels and 12 Mpixels and the resolution of the array of depth map pixels is between 0.4 kpixels and 308 kpixels.

4. The apparatus according to claim 1, wherein the image pixels are smaller than the depth map pixels.

5. The apparatus according to claim 1, wherein the image pixels comprise red pixels, green pixels and blue pixels.

6. The apparatus according to claim 1, wherein the depth map pixels comprise infrared pixels.

7. The apparatus according to claim 1, wherein the image camera and the depth map camera are arranged having a field of view of the image camera and a field of view of the depth map camera that are overlapping in an overlapping region.

8. The apparatus according to claim 1, wherein to determine whether the detected face matches the known face includes to determine whether the detected face is a three-dimensional face.

9. The apparatus according to claim 1, wherein the processing circuitry is configured to determine whether the detected face is two-dimensional or three-dimensional based on the depth map.

10. The apparatus according to claim 1 wherein the processing circuitry is configured to, responsive to a determination that the detected face is three-dimensional, determine whether the detected face matches the known face based on the depth map.

11. The apparatus according to claim 1, wherein the processing circuitry is configured to determine a size of the detected face based on the depth map.

12. The apparatus according to claim 1, wherein the processing circuitry is configured to upscale the resolution of the depth map to match the resolution of the image.

13. The apparatus according to claim 1, wherein the processing circuitry is configured to:
    determine a position of the detected face in the depth map; and
    determine a position of the detected face in the image based on the position of the detected face in the depth map.

14. The apparatus according to claim 1, wherein the depth map camera comprises at least one component configured to perform at least one of:
    determine whether the detected face is two-dimensional or three-dimensional based on the depth map;
    determine a shape of the detected face based on the depth map and compare the shape of the detected face with a shape of the known face;
    determine features of the detected face based on the depth map and compare the features of the detected face with one or more features of the known face;
    determine positions of features of the detected face based on the depth map and compare the positions of the features of the detected face with positions of one or more features of the known face;
    determine the distance between the apparatus and the detected face based on the depth map;
    determine a shortest distance between the apparatus and the detected face based on the depth map;
    determine a distance between the apparatus and a center of the detected face based on the depth map;
    determine a size of the detected face based on the depth map;
    determine a length of the detected face along a major axis and a width of the detected face along a minor axis;
    upscale the second resolution of the depth map to match the first resolution of the image; or
    determine a position of the detected face in the depth map.

15. The apparatus according to claim 1, wherein the image camera comprises at least one component configured to:
    determine a position of the detected face in the image based on a position of the detected face in the depth map.

16. A system, comprising:
    an image camera configured to capture an image having a first resolution;
    a depth map camera configured to capture a depth map having a second resolution, the first resolution being greater than the second resolution; and
    processing circuitry coupled to the image camera and depth map camera and configured to perform facial recognition based on the captured image and depth map, wherein the processing circuitry is configured to, responsive to a determination that a detected face matches a known face, determine whether the detected face is two-dimensional or three-dimensional based on the depth map, wherein the processing circuitry is configured to:
    align the depth map with the image based on a distance between the image camera and the depth map camera and a distance between the apparatus and the detected face; and
    determine a tone of the detected face based on the image and compare the tone of the detected face with a tone of the known face.

17. The system according to claim 16, wherein the system comprises a mobile phone, a tablet computer, a desktop computer, a laptop computer, a video game console, a video door or a smart watch.

18. A method for performing facial recognition, the method comprising:
    capturing a first resolution image with an image camera;
    capturing a second resolution depth map with a depth map camera, wherein the second resolution is less than the first resolution; and
    performing facial recognition based on the image and the depth map, the performing facial recognition including:
        determining whether the detected face matches with a known face;

responsive to determining that the detected face matches the known face, determining whether the detected face is two-dimensional or three-dimensional;

aligning the depth map with the image based on a distance between the image camera and the depth map camera and a distance between the apparatus and the detected face; and determining a tone of the detected face based on the image and comparing the tone of the detected face with a tone of the known face.

19. A non-transitory computer-readable medium having instructions stored thereon that, when executed by one or more computer processors, cause the one or more computer processors to:

capture a first resolution image with an image camera;

capture a second resolution depth map with a depth map camera, wherein the first resolution is greater than the second resolution; and perform facial recognition based on the captured first resolution image and second resolution depth map, the performing facial recognition including:

determining whether the detected face matches with a known face;

responsive to determining that the detected face matches the known face, determining whether the detected face is two-dimensional or three-dimensional;

aligning the depth map with the image based on a distance between the image camera and the depth map camera and a distance between the apparatus and the detected face; and determining a tone of the detected face based on the image and comparing the tone of the detected face with a tone of the known face.

20. The non-transitory computer-readable medium of claim 19, wherein to perform facial recognition includes to determine whether a face detected in the first resolution image matches with a known face based at least in part on the first resolution image.

21. The method of claim 18, wherein performing facial recognition based on the image and the depth map comprises:

determining whether the detected face matches with a known face based on the first resolution image; and responsive to determining that the detected face matches the known face, determining based on the depth map whether the detected face is two-dimensional or three-dimensional.

22. The apparatus of claim 1 wherein the circuitry is configured to initiate facial recognition using the depth map and, in response to the depth map indicating a match, initiate facial recognition using the image.

23. The apparatus of claim 1 wherein the circuitry is configured to selectively authorize an action based on the determination of whether the detected face is two-dimensional or three-dimensional.

24. The system of claim 16, comprising a housing.

25. The apparatus of claim 1 wherein the processing circuitry includes a circuit embedded in the image camera and a circuit embedded in the depth camera.

* * * * *